United States Patent
Abdelnur et al.

(10) Patent No.: US 6,429,882 B1
(45) Date of Patent: Aug. 6, 2002

(54) USER INTERFACE COMPONENT

(75) Inventors: Alejandro H. Abdelnur, Sunnyvale, CA (US); Chris Ferris, Whitinsville, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/268,817

(22) Filed: Mar. 15, 1999

(51) Int. Cl.[7] .............................................. G06F 17/30
(52) U.S. Cl. ....................................... 345/763; 345/744
(58) Field of Search ................................. 345/333, 335, 345/340, 348, 349, 339, 145–146, 763, 762, 802, 825, 744, 745–747, 826, 705–715; 707/10; 709/230

(56) References Cited

U.S. PATENT DOCUMENTS

| | | | | |
|---|---|---|---|---|
| 5,630,131 A | * | 5/1997 | Palevich et al. | 395/701 |
| 5,652,884 A | * | 7/1997 | Palevich | 395/651 |
| 5,850,548 A | * | 12/1998 | Williams | 395/701 |
| 5,883,639 A | * | 3/1999 | Waltou et al. | 345/473 |
| 5,945,989 A | * | 8/1999 | Fieshtat et al. | 345/763 |
| 6,002,395 A | * | 12/1999 | Wagner et al. | 345/744 |
| 6,195,092 B1 | * | 2/2001 | Dhond et al. | 345/763 |

OTHER PUBLICATIONS

Lieberman, H., Using Prototypical Objects to Implement Shared Behavior in Object Oriented Systems, OOPSLA '86 Proceedings, Sep. 1986, pp. 214–223.

JavaBeans API Specification, Version 1.01, Jul. 24, 1997, Sun Microsystems, Inc., available from {http://java.sun.com/beans/spec.html}.

* cited by examiner

*Primary Examiner*—Steven Sax
(74) *Attorney, Agent, or Firm*—J. D. Harriman, II, Esq.; Coudert Brothers LLP (57) ABSTRACT

A user interface component. One or more embodiments provide a framework to develop a graphical user interface (GUI) for applications and to present information to a user. The framework provides a common look, feel, and usage with a layout that may follow a designated style guide. Aspects of a business (e.g., customers, vendors, or invoices) are created in the form of business objects. An editor that provides the ability to display and modify attributes of each business object (e.g., the address, name and phone number may be attributes of a customer object) is created. A set of commands that implement the changes made in an editor and that are executed upon execution of an event (such as the selection of a button on a display, e.g., a "save" button) are also defined. One or more embodiments of the invention provide for the defining of information relating to a GUI's menu bar, tool bar, and action bar. Such user interface information may be provided in a properties file. One or more embodiments of the invention utilize the properties file to build the GUI menu bar, tool bar, and action bar. One or more embodiments of the invention utilizes information from the properties files and automatically maps the options from the different GUI bars to the appropriate command. Subsequent changes to the GUI bars may be done by updating the properties file without the need for recompilation.

21 Claims, 7 Drawing Sheets

452 view.menu.type=Menu
view.menu.parent=MenuBar
view.menu.label=View
arrange.menu.type=Menu
arrange.menu.label=View
cascade.menu.type=RadioButtonMenuItem
cascade.menu.parent=arrange
cascade.menu.label=Cascade
cascade.menu.group=G1
cascade.menu.icon=XX
tile.menu.type=RadioButtonMenuItem
tile.menu.parent=arrange
tile.menu.label=Tile
tile.menu.group=G1 customer.menu.options=file,new,open,save,view,arrange,tile,cascade,over,print 456

Menu Options customer.toolbar.options=print 458

Toolbar Options customer.actionbar.options=update,delete,clear 460

Action Bar Options

454

Common for Editor Commands

Customer's Bar Definitions customer.file.menu.type=Menu
customer.file.menu.parent=MenuBar
customer.file.menu.label=File
customer.print.menu.type=MenuItem
customer.print.menu.parent=file
customer.print.menu.label=Print
customer.new.menu.type=MenuItem
customer.new.menu.parent=file
customer.new.menu.label=New
customer.open.menu.type=MenuItem
customer.open.menu.parent=file
customer.open.menu.label=Open
customer.save.menu.type=MenuItem
customer.save.menu.parent=file
customer.save.menu.label=Save 462

Menu Bar customer.print.toolbar.type=Push
customer.print.toolbar.pos=1
customer.print.toolbar.icon=XX
customer.print.toolbar.label=Print

464

Tool Bar cusomter.update.actionbar.type=Push
customer.update.actionbar.label=Update
customer.update.actionbar.icon=XXXupdate
customer.update.actionbar.pos=1
customer.update.actionbar.label=Update
customer.delete.actionbar.type=Push
customer.delete.actionbar.label=Delete
customer.delete.actionbar.icon=XXXDelete
customer.delete.actionbar.pos=2
customer.delete.actionbar.label=Delete
customer.clear.actionbar.type=Push
customer.clear.actionbar.label=Clear
customer.clear.actionbar.icon=XXXClear
customer.clear.actionbar.pos=3
customer.clear.actionbar.label=Delete 466

Action Bar

USER INTERFACE COMPONENT

BACKGROUND OF THE INVENTION

1. Field of the Invention

This invention relates to the field of computer interfaces, and, more specifically, to displaying and modifying a graphical user interface.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, HotJava and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Businesses often store information on a computer. Customarily, the information or data that is stored consists of various aspects of the business such as the business customers, its vendors, its employees, or invoices. For example, the business may want to store the name, address, phone number, and contact person for each of its customers. Similarly, a business may want to store the same information for each of its vendors. Each of these business aspects may be viewed as an object and referred to as a business object (e.g., a customer business object, a vendor business object, an employee business object, or invoice business object). The information contained within each business object may be referred to as a property of the business object or business object data (e.g., a customer's business object data may consist of a name, address, phone, etc.).

Business object data may and often needs to be modified and edited. One problem with prior art methods for modifying business object data is that the prior art does not present the frame/context containing the business object data (e.g., the main window, the menus, the toolbar, the action bar, the status bar, etc.) in a display with a common look and feel and the methods for modification are inefficient. Consequently, not only must the developer individually program (possibly according to a set of look and feel guide lines) the way the information of the business object is displayed (e.g., how to organize the layout of the data), but the developer must individually program the frame/context containing the business information. Thus, any changes to the display and frame/context must also be hand coded by a programmer/developer. Another problem is that the prior art requires a programmer to individually map or bind the methods/commands (e.g., a "save" command to save changes to a database or a "delete" command to delete a record from a database) to the graphical/displayed representation of that command (e.g., a "save" button, or "delete" button in a display). These disadvantages and requirements of the prior art may be better understood by reviewing displays (also referred to as graphical user interfaces (GUIs)).

Graphical User Interfaces

A graphical user interface or GUI is a graphical representation or presentation of information. Various options that provide the user with the ability to manipulate information and data may be presented in a GUI that may consist of a window or menu. For example, customer information such as a customer name, contact name, address, and zip code may be presented to a user in a visually appealing manner such that the words "Customer Name" appear next to a text field box with a space for a name, the words "Contact Name" appear next to a text field box with a space for a name, the word "Address" appears next to a text field box with a space for an address, and the words "Zip Code" appear next to a text field box with a space for a zip code. The field names (i.e., Customer Name, Contact Name, Address, and Zip Code) may be displayed in a specific font or color with the text field boxes (or the information in the text field boxes) in the same or different font or color. Thus, the GUI provides for the display of the information.

Figure 1:
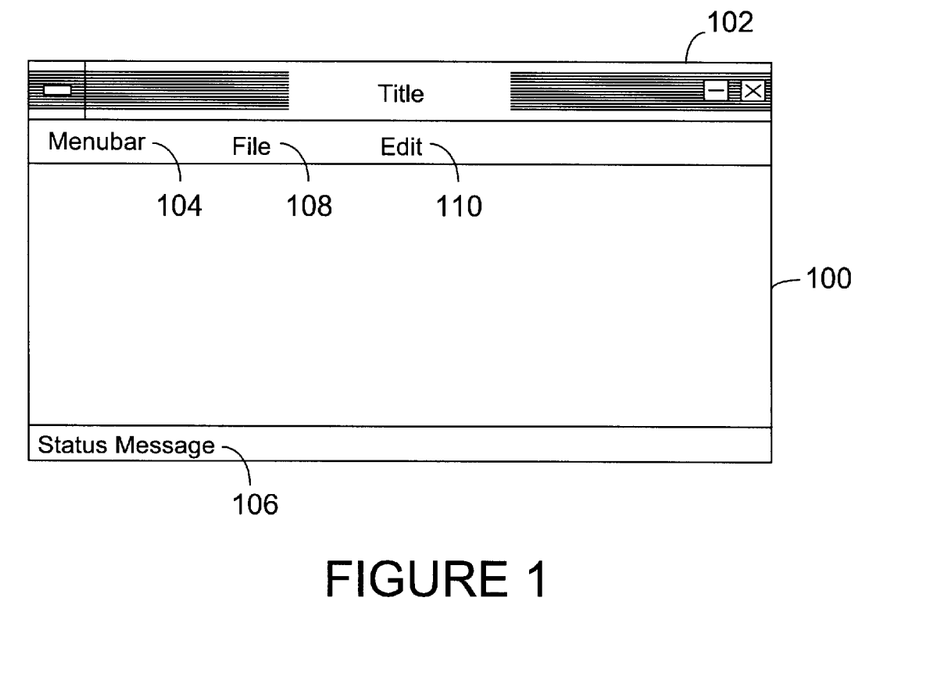
FIG. 1 illustrates a graphical user interface.

Commonly, a GUI representation of information is displayed in a window with several standard components that are displayed regardless of the type, style, or content of the information to be displayed by the GUI. FIG. 1 illustrates the standard components of a GUI. For example, a GUI is contained within frame 100. The top of the GUI may have a title bar 102 for which a title may be specified (e.g., CustomerGUI).

Below title bar 102 may be a menu bar 104. Menu bar 104 has various capabilities. A menu may be displayed to the user with various submenus. For example, the menu may contain options File 108 and Edit 110. File 108 may in turn have submenus such as New, Open, Close, Save, and Print. Edit may have submenus such as Cut, Copy, Paste, etc. Each submenu may be a menu itself or a command that can be selected by the user.

At the bottom of frame 100 may be a Status Bar 106 that contains a status message such as "Update Completed". In addition, various action bars containing actions to be taken or buttons with icons on them may be present within GUI frame 100.

The text that appears within a menu, bar, or within the frame is a "label". Any image or picture that appears in a menu, bar, or within the frame is an icon. When the user selects an icon, or option, such selection is referred to as an event. Upon the occurrence of an event, an action or command is initiated. For example, when a user selects the save option from a menu, an action or command that saves the relevant information is initiated.

To display a GUI with the standard GUI components (and respective labels and icons) as described above, a programmer must define the labels, and which components are to be displayed. The prior art requires that the programmer set the GUI components within the code for the GUI. Further, any commands or actions that occur in response to an event must be set by the programmer in the computer code. To run a computer program, computer code must be compiled or converted into an executable form. It is desirable to modify a GUI without having to change the underlying code and recompiling the computer code.

SUMMARY OF THE INVENTION

A user interface component. One or more embodiments provide a framework to develop a graphical user interface (GUI) for applications and to present information to a user. The framework provides a common look, feel, and usage with a layout that may follow a designated style guide.

Aspects of a business (e.g., customers, vendors, or invoices) are created in the form of business objects. An editor that provides the ability to display and modify attributes of each business object (e.g., the address, name and phone number may be attributes of a customer object) is created. A set of commands that implement the changes made in an editor and that are executed upon execution of an event (such as the selection of a button on a display, e.g., a "save" button) are also defined. One or more embodiments of the invention provide for the defining of information relating to a GUI's menu bar, tool bar, and action bar. Such user interface information may be provided in a properties file. One or more embodiments of the invention utilize the properties file to build the GUI menu bar, tool bar, and action bar.

One or more embodiments of the invention utilizes information from the properties files and automatically maps the options from the different GUI bars to the appropriate command. Subsequent changes to the GUI bars may be done by updating the properties file without the need for recompilation.

DETAILED DESCRIPTION OF THE INVENTION

The invention is a user interface component. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The following description discloses embodiments of an apparatus for implementing a user interface component and utilization of the user interface component. First, however, a description is given below of an embodiment of computer apparatus suitable for providing an execution environment for the software apparatus of the invention.

Embodiment of Computer Execution Environment (Hardware)

Figure 2:
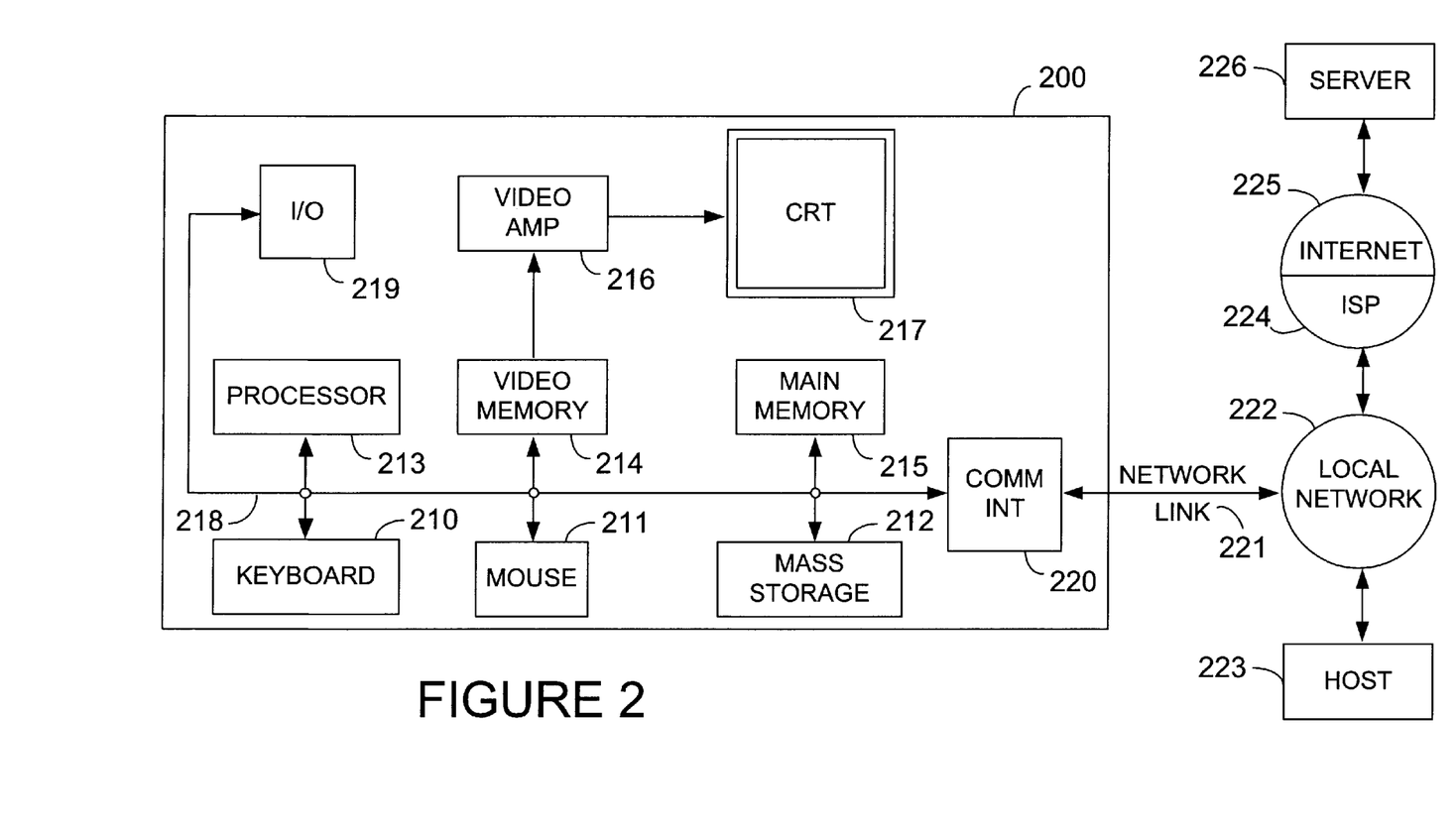
FIG. 2 is a block diagram a computer system capable of providing a suitable execution environment in accordance with one or more embodiments of the invention.

An embodiment of the invention can be implemented as computer software in the form of computer readable code executed on a general purpose computer such as computer 200 illustrated in FIG. 2, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 210 and mouse 211 are coupled to a system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to system bus 218 represents such I/O elements as a printer, A/V (audio/video) I/O, etc.

Computer 200 includes a video memory 214, main memory 215 and mass storage 212, all coupled to system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 64-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to local server computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, remote server computer 226 might transmit a requested code for an application program through Internet 225, ISP 224, local network 222 and communication interface 220. In accord with the invention, one such downloaded application is the apparatus for selecting attachments described herein.

The received code may be executed by processor 213 as it is received, and/or stored in mass storage 212, or other non-volatile storage for later execution. In this manner, computer 200 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Embodiment of Software Apparatus for a User Interface Component

An embodiment of the invention includes software apparatus comprising a component or collection of components configured to provide a framework to develop the graphical user interface (GUI) of applications. The components may be implemented as instances of object classes in accordance with known object-oriented programming practices, or the components may be implemented under one or more component model definitions. Several component model definitions are currently available, such as COM, CORBA, and the Java™ component scheme referred to as JavaBeans™.

Each component model provides for encapsulation of related functions and data structures into individual components, similar to what occurs under a standard object-oriented programming (OOP) approach. The particular mechanisms by which the components are managed and interact are defined according to the respective component model. Bridges (e.g., ActiveX) may be constructed which allow components designed under different component model definitions to interact within a single application. Interaction is typically performed through a set of methods implemented by the component. These sets of methods are referred to as "interfaces" in some component models. The public methods by which OOP object classes interact are often presented in the form of application programming interface (API) definitions.

To provide a better understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java™ programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment may be extended to the notion of components under a component model definition.

Implementation in the Java Programming Language

Embodiments of the invention may be implemented in any type of programming language (object oriented or otherwise) including but not limited programming languages such as Fortran, Pascal, Assembly Language, C, C++, Ada, LISP, Java or Visual Basic. The description, examples, and implementations described below may refer to or utilize the Java programming language and JavaBeans™ components, but the invention is not limited to use of the Java programming language or JavaBeans components and may be implemented in any type of programming language.

The Java programming language is an object-oriented programming language with each program comprising one or more object classes. Unlike many programming languages, in which a program is compiled into machine-dependent, executable program code, Java classes are compiled into machine independent bytecode class files. Each class contains code and data in a platform-independent format called the class file format. The computer system acting as the execution vehicle supports the Java runtime environment. The runtime environment contains a program called a virtual machine, which is responsible for executing the code in Java classes.

Applications may be designed as standalone Java applications, or as Java "applets" which are identified by an applet tag in an HTML document, and loaded by a browser application. The class files associated with an application or applet may be stored on the local computing system, or on a server accessible over a network. Each class is loaded into the Java runtime environment, as needed, by the "class loader."

Java classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Java classes may also be incorporated into Java components referred to as JavaBeans components. JavaBeans components are designed in accordance with the JavaBeans API Specification to allow for component-based application building. Bridges (e.g., ActiveX bridges) may be used with JavaBeans components to allow JavaBeans components to be used in other component model environments, such as OLE/COM and CORBA.

Support for features such as "introspection," "customization," "events," "properties" and "persistence" is provided within the JavaBeans framework to facilitate application building and component use. "Introspection" permits builder tools to analyze how a particular bean works. "Customization" permits an application builder to customize the appearance and behavior of a bean. "Events" provide a simple communication metaphor that can be used to connect a bean with other application components or beans. "Properties" are used for bean customization and programmatic use. "Persistence" allows for a bean to have its customized state saved and reloaded later. These features are discussed in the JavaBeans API Specification, Version 1.01, by Sun Microsystems (1997), which is available on the World Wide Web at the URL, "http://java.sun.com/beans/spec.html", and is incorporated herein by reference.

Embodiments of the software apparatus may be implemented using any programming language including standard OOP object classes or using components under a known component model definition. For the purposes of the following description, references to components may refer to instances of OOP object classes or components under a known component model.

Implementation of Software Apparatus for a User Interface Component

Figure 3:
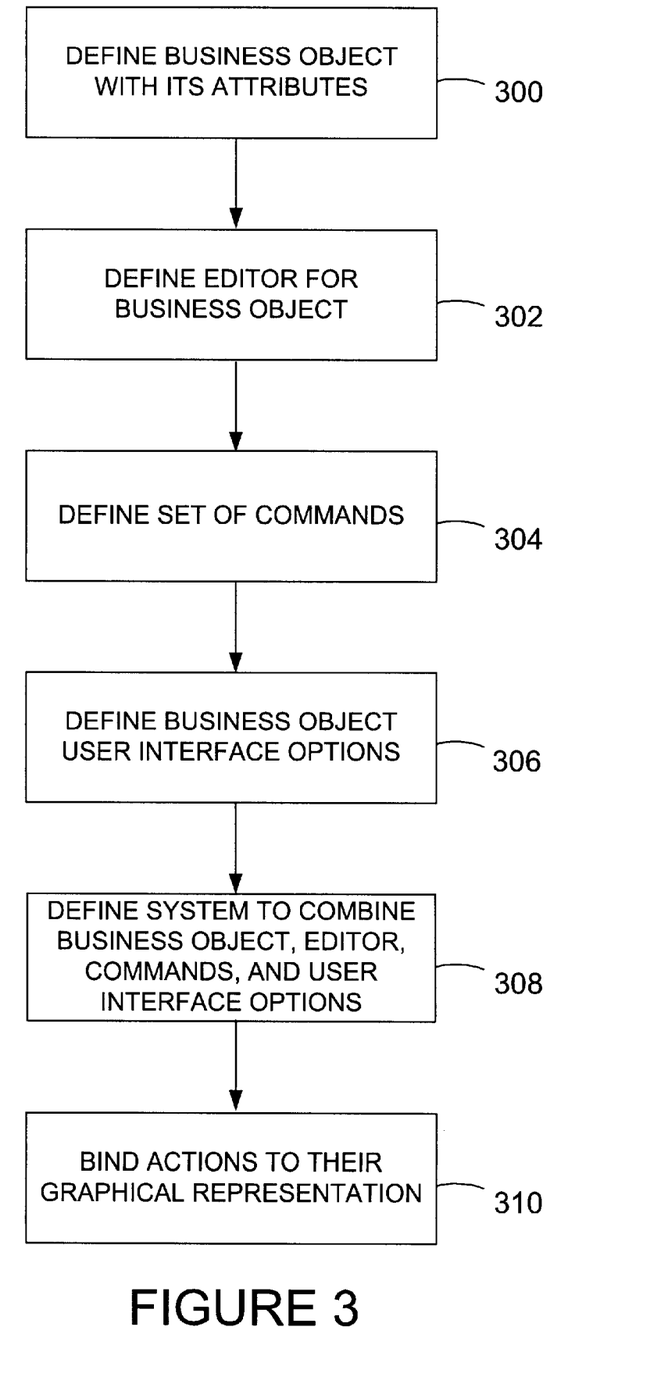
FIG. 3 demonstrates a method of creating a user interface component in accordance with one or more embodiments of the invention.

As described above, a business is comprised of multiple components such as customers, salespersons, employees, vendors, invoices, etc. Each component has various properties or attributes (e.g., name, address, phone, id, etc.). Each component may be represented as an object referred to as a business object (BO). A business object may also be an object oriented object or a JavaBeans component with each property of the JavaBeans component mapping to an attribute of the business object. The user interface component (UIC) provides a framework to develop the graphical user interface within which each business object may be displayed to a user. Referring to FIG. 3, to utilize a UIC, steps 300–308 may be required. At step 300, the BO is defined with its attributes. At step 302, an editor (a GUI representation of the BO) is defined for the BO. At step 304, a set of commands for the BO (such as updating the information in an application server or database) are defined. At step 306, the BO's user interface options are defined in a properties file. At step 308, the BO is combined with the editor, set of commands, and user interface options. At step 310, actions of the commands are automatically bound to their corresponding graphical representation. Details and an example of these steps are set forth below.

One type of BO that may be implemented is a customer BO (representing customer(s) of a business). The first step towards utilizing a UIC for a customer BO is step, 300, defining the customer BO. Defining a business object consists of defining the various properties/attributes of the business object and the ability to set and retrieve these properties. For example, a customer BO may be comprised of four properties: id, name, phone and address with each of these properties represented in JavaBeans components or an object oriented object. The ability to modify and edit each of the properties may be established by a developer (in the form of a setX or getX method). For example, a developer may implement the following procedures to set/retrieve the properties of a customer BO:

```
public void setID(String id) {...}
public String getID( ) {...}
public void setName(String name) {...}
public String getName( ) {... }
public void setPhone(String phone) {...}
public String getPhone( ) {...}
public void setAddress(String address) {...}
public String getAddress( ) {...}
```

Figure 4A:
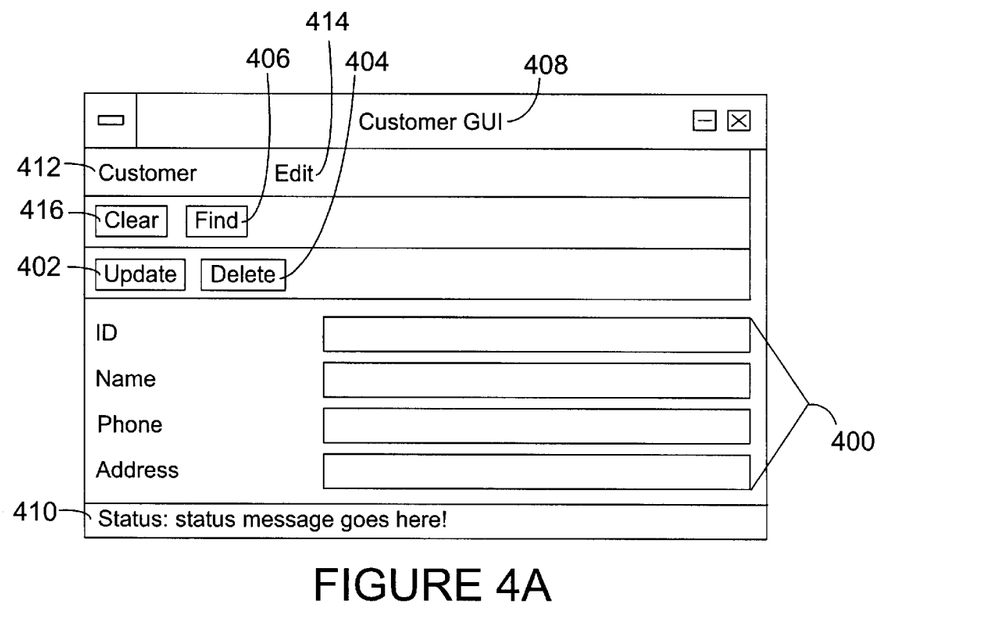
FIG. 4A illustrates a GUI representation of the customer BO and its options.

The next step towards utilizing a customer BO is step 302, defining an editor or editor command for the customer BO. An editor/editor command is an apparatus or object that knows how to display the BO and its properties in a GUI. Details regarding the exact formatting (such as the action bar, menu bar, and content of the bars) are not provided by an editor. The editor command is responsible for and is used to specify and provide the labels, fields, and widgets used to define the GUI representation of the BO and their layout/formatting. Thus, the editor provides for the data to be displayed (but not the particular style or look and feel of the display which is provided by a GUI toolkit or context being used). Further an editor maintains the ability to modify a BO's properties/information. FIG. 4A illustrates a GUI representation of the customer BO and its options. Section 400, comprises the id, name, phone, and address labels along with the textfields, comprises the editor for the customer BO. For the customer BO, the editor knows how to display the id, name, phone, address labels, and their associated text fields. Additionally, the editor knows how to modify the id, name, phone, and address. An editor provides a configured screen with the GUI representation of the BO but does not provide a menu bar, toolbar, or action bar or specify the formatting of the GUI.

Thus, for each BO, an editor may be utilized. In one or more embodiments, editors implement an EditorCommand Interface. It is the responsibility of the EditorCommand implementation to provide the GUI representation of the BO and to show and keep in sync the data that the GUI is displaying and the actual data of the BO. For example, the following code demonstrates a customer editor:

```
// CustomerEditor.java
public class CustomerEditor extends JPanel implements
    EditorCommand { public CustomerEditor( ) {..}
// The Customer Editor constructor initializes the
// instance and creates the GUI to display the Customer
// BO.

// methods from the Command interface
public void setDataObject(Object c) {..}
public Object getDataObject( ) {..}
public void setCommandContext(CommandContext
    commandContext) {..}
public CommandContext getCommandContexto( ) {..}

// methods from the EditorCommand interface public JPanel
    getjPanel( ) {..}
    // Returns a panel to display the object properties
public void setStatusMessage(String message) {..}

// "Editor" methods that operate on the Customer Object
public void doClear( ) {..}
public void doCopy( ) {..}
public void dopaste( ) {..}
public void doCut( ) {..}

// textfields to display Customer properties
JTextField tfid;
JTextField tfname;
JTextField tfphone;
JTextField tfaddress;

// creates/initializes the GUI with above textfields (the four
    // labels and four text fields, for the four customer
    attributes.
private void makePanel( ) {..}}
```

The next step towards utilizing a UIC is step 306, defining a set of commands for the customer BO. Each business object may be bound to several commands that know which business object to perform the desired action with/on. Each command is comprised of one or more methods that perform some action with or on the bound BO. For example, an Editor command would know how to utilize the editor above to provide a GUI representation of the BO. Other examples of potential commands include but are not limited to a Print command (a command that prepares the contents of a business object for printing and prints the contents), an Update command (for updating the attributes of a BO), a Retrieve command (for retrieving the properties of a BO), or a DBCommand that defines/contains methods to update, retrieve, and perform other database actions on a bound BO. Thus, a command may provide a set of similar tasks (e.g., a set of database actions, a set of print actions, or a set of actions to display a BO).

In one or more embodiments, each command is an object oriented class that implements a Command interface. Thus, each command in the class is a command class that implements the Command Interface. The methods/actions within each implementation provide the ability to perform some action on or with the business object and/or its properties. In one or more embodiments, a naming convention is utilized for the actions. For example, each action within a command may contain the prefix "do".

For example, with a customer BO, a CustomerDB command (that implements the Command interface) may be implemented with methods that provide the ability to update, delete, and find a customer BO from a database. For example, the following code illustrates a potential CustomerDB command implementation:

```
// CustomerDB.java
public class CustomerDB implements Command {

// provides access to this command's data object
    private CommandSupport commandSupport=null;

public CustomerDB( ) {
        commandSupport=new CommandSupport( );
    }

// implements methods of the Command interface
    public void setDataObject(Object c) {..}
    public Object getDataObject( ) {..}
    public void setCommandContext(CommandContext
        commandContext) {..}
    public CommandContext getCommandContext( ) {..}

// "DB" methods that operate on the Customer BO
    public void doUpdate( ) {..}
    public void doDelete( ) {..}
    public void doFind( ) {..}

}
```

The above CustomerDB command implementation implements the methods to perform the "DB" (database) actions such as update, delete, and find on the customer BO. In one or more embodiments, the action name (e.g., update, delete, and find) prefixed with "do" may be utilized as the naming convention for the user interface component, but any other naming convention may be utilized.

Referring to FIG. 4A, the actions within the commands correspond to the options displayed in the user interface (e.g., doUpdate corresponds to Update option 402, doDelete corresponds to Delete option 404 and doFind corresponds to Find option 406). Although the actions correspond to the options in the user interface, the actions have only been created and have not yet been mapped/bound to the user interface options. Consequently, when a user selects option Update 402, the action doUpdate is not yet executed (although it has been created).

The next step towards utilizing a user interface component is step 306, defining the user interface (UI) options of the BO in a properties file. This step defines the UI options that will make up the menu bar, tool bar, and action bar in the BO's GUI. In one or more embodiments, the UI options are defined in a properties file. The properties file may be in any format (e.g., ASCII) and may consist of key-value pairs with the key representing the location of the specific component (e.g., menu bar, title bar, or action bar) and the value representing the information, (e.g., the label to be displayed at the specified location). The properties file may be loaded into a properties object and passed to the user interface component as described below. The properties file contains information about the menu bar, tool bar, and action bar options of one or more BOs. Each BO's option entries may be identified by a prefix. For example, in a customer BO, the prefix may be "customer".

Figure 4B:
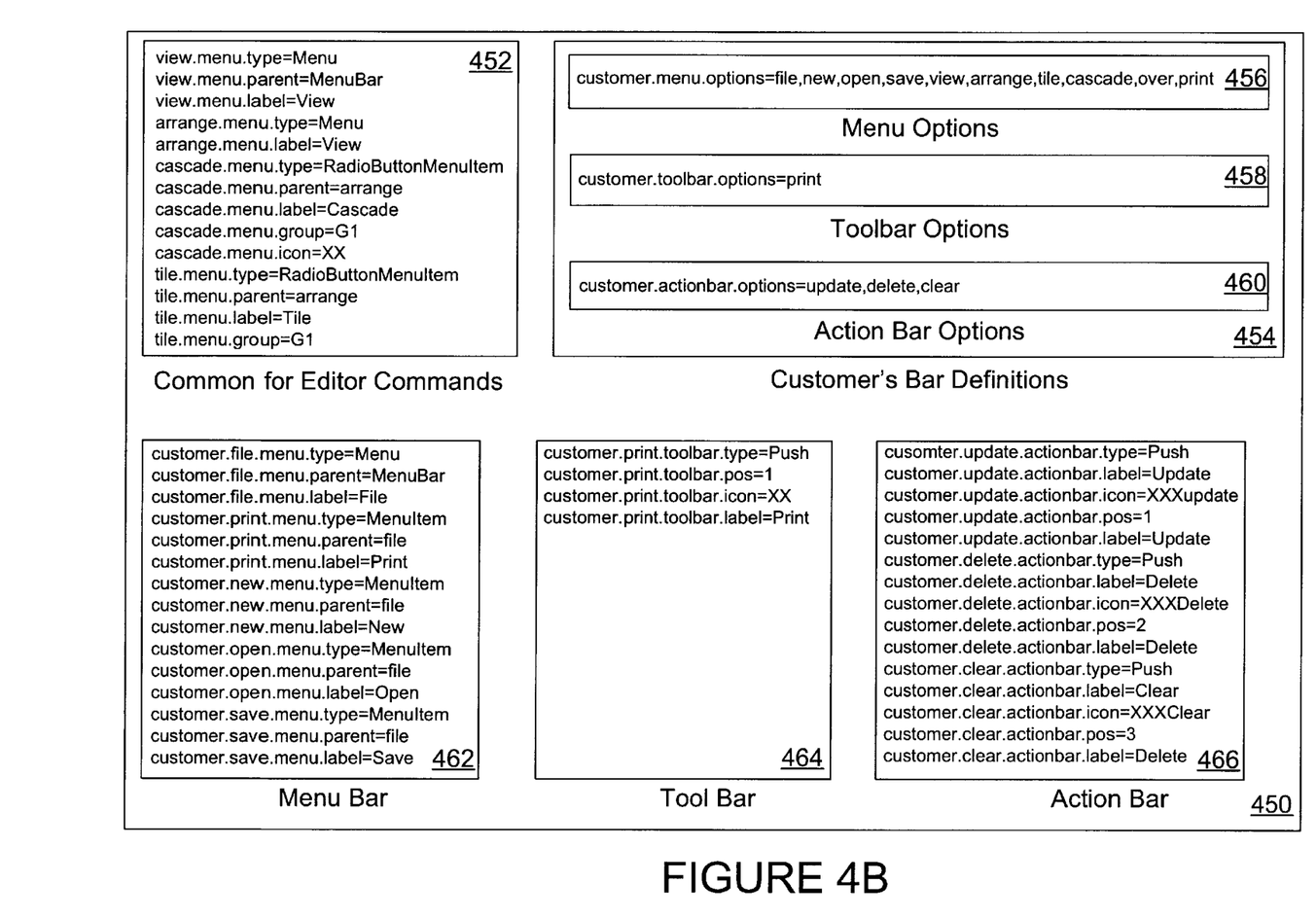
FIG. 4B illustrates an example of a customer properties file.

FIG. 4B illustrates an example of a customer properties file 450. Properties file 450 may include: a common for different Editor Commands 452; various customer bar definition options 454, namely, menu options 456, toolbar options 458, and actionbar options 460; the customer's menu bar 462; the customer's tool bar 464; and the customer's action bar 466. As described above, the various elements of properties file 450 may be in any format including ASCII text. As defined in properties file 450, menu bar 464 consists of file, print, new, open, and save options (with additional options not completely defined); toolbar 464 consists of the print option; and action bar 466 consists of update, delete, and clear options.

Referring to FIG. 4A, title 408 of the Customer GUI frame may be "CustomerGUI". To specify such a title, the properties file may contain a command such as "customer.title=CustomerGUI". Options that comprise the menu bar of the Customer GUI may also be specified in the properties file. For example, FIG. 4A demonstrates the placement of "Customer" and "Edit" in the menu bar. To specify menu bar options, a command such as "customer.menu.options=customer,edit" may be placed in the properties file. In addition to specifying "customer" and "edit" any suboptions that arise out of "customer" and "edit" should also be placed in the properties file. For example, the "customer" menu bar option may have a suboption of "print". To define the "print" suboption, the properties file may contain the following entries:

customer.print.menu.type=MenuItem
customer.print.menu.parent=customer
customer.print.menu.label=Print
customer.print.menu.icon=file:/home/fatima/images/copy.gif
customer.print.menu.separator=after The above commands indicate that "print" is a type of menu option called MenuItem. Types of menu options could be Menu (e.g., Customer), MenuItem (a suboption of a Menu), a CheckBoxMenuItem (a MenuItem that has a box and may contain a check to indicate that it has been selected), or a RadioButtonMenuItem (a MenuItem that has a button that may contain a darkened circle within the button to indicate that it has been selected). The "parent" value indicates that print's parent is "customer" (i.e., "print" is a suboption of "customer"). The label of the menubar option (i.e., what is displayed in the GUI) is "Print". The icon (e.g., a small image) that will be displayed along with the "print" menu item is a gif file called "copy.gif". For each option, a label and/or icon should be defined in order to display that option. The "separator" property defines whether a separator (e.g., a line, or indent) is to be added before and/or after the "print" menu time. Valid values for the separator parameter may be "before", "after", or "both", for example.

In addition to specifying the menubar options, similar options for the toolbar and action bar should be specified in the properties file. For example, in the Customer GUI of FIG. 4A, the action bar contains buttons for Clear 416, Find 406, Update 402, and Delete 404. To define such options, the word "menu" may be replaced with the word "toolbar" or "actionbar" in the above examples. Thus, the format for defining elements in the properties file are:

"<prefix>.<option>.<menu|toolbar|actionbar>.<property>=<value>", where <prefix> specifies the business object (e.g., customer, vendor, invoice, etc.), <option> specifies the attribute of the business object (e.g., clear, update, delete, etc.), <property> specifies the property of the attribute that is being modified (e.g., type, label, icon, etc.), and <value> specifies the value of the property.

The next step towards utilizing the user interface component is step 308, combining the business object, editor, set of commands, and user interface options. The elements may be combined in a container class for each BO. For example, in one or more embodiments, an EditorCommandContainer class contains or is bound to all of the components. In one or more embodiments, a Business Object may be bound to the commands (e.g., including the editor command); the commands are bound to the container (e.g., the editor container); a properties instance is provided or created (e.g., using a properties file); using the information from the properties instance, the user interface options (menubar, toolbar, and actionbar items) are constructed and bound to the matching actions.

The last step 310 towards utilizing the UIC is binding the actions of each command to the appropriate graphical representation. By binding the actions to the appropriate displayed elements, upon the occurrence of an event (such as the selection of a button or menu item), the appropriate command(s) will be executed. As described above, in one or more embodiments, the user interface options are provided in a properties file.

Figure 5:
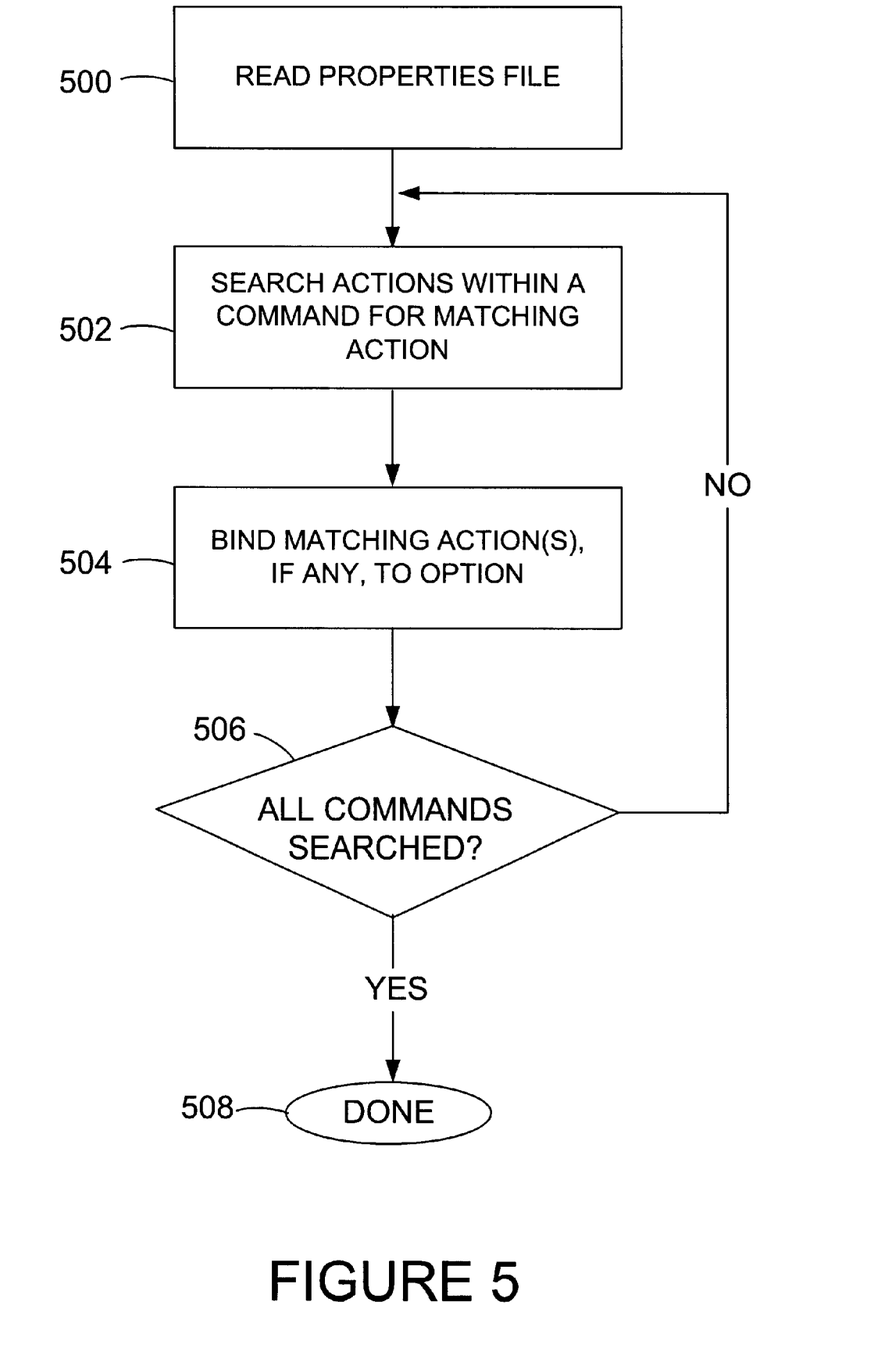
FIG. 5 illustrates a method used to bind options to commands in accordance with one or more embodiments of the invention.

FIG. 5 illustrates a method used to bind the options to the commands. At step 500, the properties file is read and the user interface options are parsed out. At step 502, the actions within a command are searched to determine if they match one of the user interface options parsed out from the properties file. A match occurs when the name of the command contains a specific prefix (as set forth by the naming convention utilized) followed by the option.

For example, if a user interface option is "Clear", and the naming convention utilizes a prefix of "do", a matching action will have the name "doClear". Similarly, if the user interface option is "Update", a matching action will have the name "doUpdate". Matching actions may be distributed across multiple command classes. For example, one command class may be for color printing and another command class may be for black and white printing. Both printing classes may contain an action named "doPrint". Consequently, if the user interface option is "Print", the corresponding matching actions will be contained in both command classes. At step 504, an action is bound to its matching option. In one or more embodiments, the binding of step 504 is performed when the command class containing matching action(s) is added to the context. At step 506, a determination is made regarding whether all of the commands have been searched for matching actions. If not all command classes have been searched, the searching and binding steps are performed on those command classes that have not yet been searched. Once all command classes have been searched and bindings performed, the process is complete at step 508.

The steps of FIG. 5 are performed automatically within the user interface component architecture. Such performance is automated as a result of the naming convention. Due to the automation, a programmer does not need to hand code the individual binding from each user interface option to the appropriate action. Further, because the properties file is searched, and the binding is automatic, when the action bar, menu bar, or tool bar are modified, the code does not need to be modified and recompiled. Instead, the properties file is merely changed and the new user interface options are automatically bound using the procedure as illustrated in FIG. 5.

Figure 6:
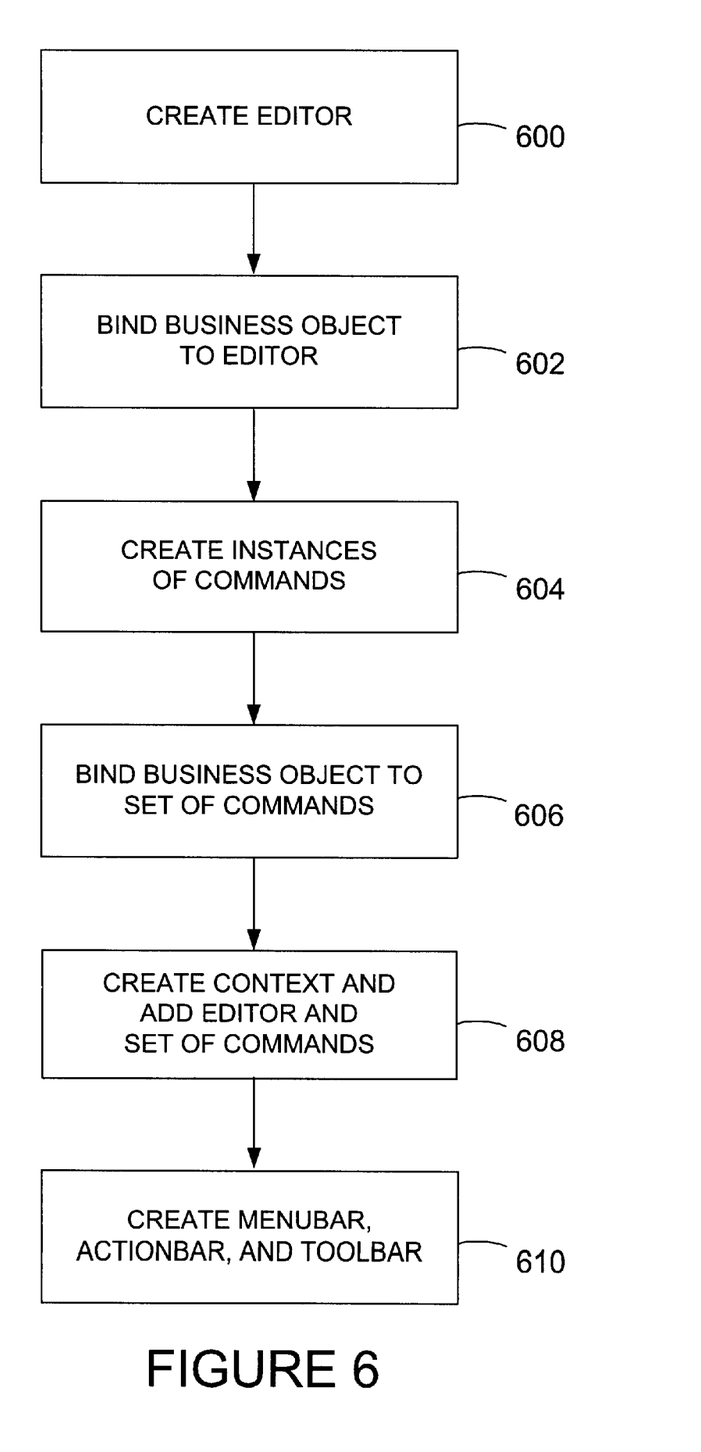
FIG. 6 demonstrates an embodiment of creating a user interface component in accordance with one or more embodiments of the invention.

FIG. 6 illustrates the creation and combination of the various elements as described above in accordance with one or more embodiments of the invention. The steps of FIG. 6 provide for the execution of a procedure that utilizes the user interface options and the business object as parameters or input. The user interface options may consist of the properties file or a properties object created using the properties file. Utilizing object oriented programming, at step 600, the procedure creates an instance of an Editor (defined as described above) and at step 602 binds the business object (passed to the procedure as a parameter) to the editor. By binding the editor to the business object, the various elements of the business object may be edited using the editor.

At step 604, one or more instances of classes that implement commands used to implement and record the modifications made in the editor for a business object (defined as described above) are created and bound to the business object at step 606. In one or more embodiments, the set of commands are implemented using a naming convention. For example, as described above, the prefix "do" may be added to each command procedure/action.

At step 608, a context (container) may then be created and the editor, business object, and set of commands are added to the context. Instead of binding the components as described above in steps 602 and 606, the components may be added to the context container at step 608. The context container has methods to add, remove, and get various command classes from the container. As described above, the command classes know how to perform an action, but do not know the context for the action. For example, a Print Command class and its constituent methods know how to print the BO, but have no knowledge of the print services needed to print the BO (e.g., the specific commands needed to print on a particular printer). Similarly, an EditorCommand may only know how to display a BO, and the context for the EditorCommand knows the context (i.e., format) in which to display the BO The context itself may implement various commands with one of the commands being a command to display the GUI representation of the BO. For example, a context container may have the knowledge to display windows in a square traditional format. Alternatively, the context container (or a second context container) may have the knowledge to display windows in a circular format with the action bars and menu bars as rings around the circle.

At step 610 the context creates a user interface display including the menu bar, action bar, and toolbar using the properties file passed as a parameter. The following code for a procedure called "CustomerWin" demonstrates the above steps to produce the customer user interface component of FIG. 3:

```
// CustomerWin.java
public class CustomerWin { public CustomerWin(Properties props,Customer customer) {
        // Two parameters—props and customer // create CustomerEditor, bind customer BO to it
        CustomerEditor customerEditor=new CustomerEditor( );
        customerEditor.setDataObject(customer);

// create CustomerDB, bind customer BO to it
        CustomerDB customerDB=new CustomerDB( );
        customerDB.setDataObject(customer);

// all commands glued together using IREditorContext
        IREditorContext ec=new IREditorContext( );
        ec.setEditorCommand(customerEditor); // Editor command
        ec.addCommand(customerDB); // /DB command // build the Customer's menubar, toolbar, actionbar
        ec.buildContext("customer",props);

// tells the EditorContext what message to display in the status
        bar
        ec.setStatusMessage("status message goes here!");
        ec.setVisible(true); // display the IREditorContext Frame
    }
}
```

With the above code, the properties from the properties file are read and converted or placed into a properties object that is passed as a parameter to the CustomerWin procedure. The following procedure called "Application.java" illustrates the reading of the properties file and the instantiation of a CustomerWin object with the properties read (as described in FIG. 6):

```
// Application.java
public class Application extends JApplet { public void init( ) {
        // load the properties from the properties file
        Properties props=new Properties( );
        URL doc=getDocumentBase( );
        URL url=new URL(doc,"../etc/customer.props");
        props.load(url.openStream( ));

// instantiate class that displays the Customer BO
        new CustomerWin(props, new Customero( ));
    }
}
```

Thus, the combination of the various elements provides for the creation of a GUI. By the user interface component reading the properties file to create the GUI, the GUI may be created with a common look and feel for all business objects. Additionally, if the user desires to delete an attribute of the GUI, the user merely needs to modify the properties file deleting the desired attribute. Subsequently, the deleted element is not read from the properties file and will not be present in the GUI.

The combination of all of the elements provide for the GUI of a business object. In one or more embodiments, the common look and feel of all GUIs may be easily modified. To easily modify the look and feel, the editor and commands may be subclasses or implementations of a container class (as described above) that specifies the graphical characteristics of the GUI. For example, a container may provide for specific positioning of a menu bar, tool bar, and action bar and the utilization of certain fonts, colors, or shading for the bars. In this manner, by changing the container, the GUI with which the set of business objects that implement that container change. Thus, by using the same container across different applications and business objects, the applications and business objects will have the same look and feel. Subsequently, the look and feel of all applications that share the container may be changed without modifying the application code itself (i.e., by replacing the container being utilized). As described above, the invention may be implemented in any programming language and the above examples and descriptions that utilize the Java programming language and JavaBeans components are examples of one or more embodiments of the invention.

Thus, a user interface component has been described in conjunction with one or more specific embodiments. The invention is defined by the claims and their full scope of equivalents.

What is claimed is:

1. A method for providing a graphical user interface comprising:
   obtaining an object with its attributes;
   obtaining an editor for said object wherein said editor maintains the ability to display and modify data of said object;
   obtaining a set of commands for said object;
   obtaining user interface options for said object and defining said interface options in a properties file;
   searching said properties file and binding said interface options to said set of commands; and
   combining said object, said editor, said set of commands, said user interface and said binding into a graphical user interface.

2. The method of claim 1 wherein said user interface options includes at least one option for a menu bar.

3. The method of claim 1 wherein said user interface options includes at least one option for a title bar.

4. The method of claim 1 wherein said user interface options includes at least one option for an action bar.

5. The method of claim 1 further comprising displaying said graphical user interface.

6. A computer program product comprising:
   a computer usable medium having computer readable code embodied therein for providing a graphical user interface, said computer program product comprising:
   computer readable code configured to cause a computer to obtain an object with its attributes;
   computer readable code configured to cause a computer to obtain an editor for said object wherein said editor maintains the ability to display and modify data of said object;
   computer readable code configured to cause a computer to obtain a set of commands for said object;
   computer readable code configured to cause a computer to obtain user interface options for said object and define said interface options in a properties file;
   computer readable code configured to cause a computer to search said properties file and bind said interface options to said set of commands; and
   computer readable code configured to cause a computer to combine said object, said editor, said set of commands, said user interface and said binding into a graphical user interface.

7. The computer program product of claim 6 wherein said user interface options includes at least one option for a menu bar.

8. The computer program product of claim 6 wherein said user interface options includes at least one option for a title bar.

9. The computer program product of claim 6 wherein said user interface options includes at least one option for an action bar.

10. The computer program product of claim 6 further comprising computer readable program code configured to cause a computer to display said graphical user interface.

11. A user interface component comprising:
    a processor;
    an object with attributes coupled to said processor;
    an editor coupled to said object wherein said editor is configured to display and modify data of said object;
    a set of commands coupled to said object;
    user interface options coupled to said object;
    a properties file defining and binding said interface options for said object to said commands; and
    a graphical user interface combining said object, said editor, said set of commands, said user interface and said binding.

12. The user interface component of claim 11 wherein said user interface options includes at least one option for a menu bar.

13. The user interface component of claim 11 wherein said user interface options includes at least one option for a title bar.

14. The user interface component of claim 11 wherein said user interface options includes at least one option for an action bar.

15. The user interface component of claim 11 further comprising computer code executed by said processor for displaying graphical user interface based on said object, said editor, said set of commands, and said user interface options.

16. An apparatus for providing a graphical user interface comprising:
    means for obtaining an object with its attributes;
    means for obtaining an editor for said object wherein said editor maintains the ability to display and modify data of said object;
    means for obtaining a set of commands for said object;
    means for obtaining user interface options for said object and defining said interface options in a properties file;
    means for searching said properties file and binding said interface options to said set of commands; and
    means for combining said object, said editor, said set of commands, said user interface and said binding into a graphical user interface.

17. The apparatus of claim 16 wherein said user interface options includes at least one option for a menu bar.

18. The apparatus of claim 16 wherein said user interface options includes at least one option for a title bar.

19. The apparatus of claim 16 wherein said user interface options includes at least one option for an action bar.

20. The apparatus of claim 16 further comprising computer code executed by said processor for displaying graphical user interface based on said object, said editor, said set of commands, and said user interface options.

21. A method for providing a graphical user interface comprising:

obtaining an object with its attributes;

obtaining an editor for said object wherein said editor maintains the ability to display and modify data of said object;

obtaining a set of commands for said object;

obtaining user interface options for said object and defining said interface options in a properties file;

searching said properties file and mapping said interface options to said set of commands;

combining said object, said editor, said set of commands, said user interface and said mapping into a graphical user interface;

changing properties in said property file and mapping said properties; and creating a second graphical user interface based on said property file.

* * * * *